United States Patent [19]

Yoshitsugu

[11] Patent Number: 4,588,208
[45] Date of Patent: May 13, 1986

[54] SAFETY BELT

[75] Inventor: Noritada Yoshitsugu, Toyota, Japan

[73] Assignee: Toyota Jidosha Kabushiki Kaisha, Japan

[21] Appl. No.: 608,450

[22] Filed: May 9, 1984

[30] Foreign Application Priority Data

May 11, 1983 [JP] Japan .............................. 58-69944[U]
Jan. 13, 1984 [JP] Japan .............................. 59-3850[U]

[51] Int. Cl.⁴ ............................................. B60R 22/28
[52] U.S. Cl. .................................. 280/805; 188/376; 297/470
[58] Field of Search ................ 280/801, 805; 297/470, 297/471, 472; 188/376

[56] References Cited

U.S. PATENT DOCUMENTS

| 1,935,339 | 11/1933 | Tricau ................................. | 297/472 |
| 3,861,744 | 1/1975 | Yamada et al. ..................... | 297/472 |
| 3,891,272 | 6/1975 | Takada ................................ | 280/805 |
| 4,027,906 | 6/1977 | Matsuoka et al. .................. | 280/805 |
| 4,099,778 | 7/1978 | Lehr .................................... | 280/805 |

FOREIGN PATENT DOCUMENTS 2426203 12/1975 Fed. Rep. of Germany ...... 280/805
2027 4/1974 Japan .
118764 9/1980 Japan .

Primary Examiner—John J. Love
Assistant Examiner—Kenneth R. Rice
Attorney, Agent, or Firm—Finnegan, Henderson, Farabow, Garrett & Dunner

[57] ABSTRACT

In a safety belt having a continuous webbing composed of a shoulder side outer webbing piece extended from an upper strengthening member at the side of an automotive body for restricting the breast of an occupant sitting on a seat and a lap side outer webbing piece extended from a lower strengthening member at the side of the body for restricting the waist of the occupant, the continuous webbing has at least one annularly folded portion formed at the continuous webbing and has a plurality of sewing patterns separately sewed adjacent to each other on the folded portion. Thus, the stretching characteristics of shoulder and lap side outer webbing pieces of the continuous webbing are formed to be different to provide buffer and energy absorbing functions of the continuous webbing, thereby further improving the performance of a conventional safety belt.

7 Claims, 5 Drawing Figures

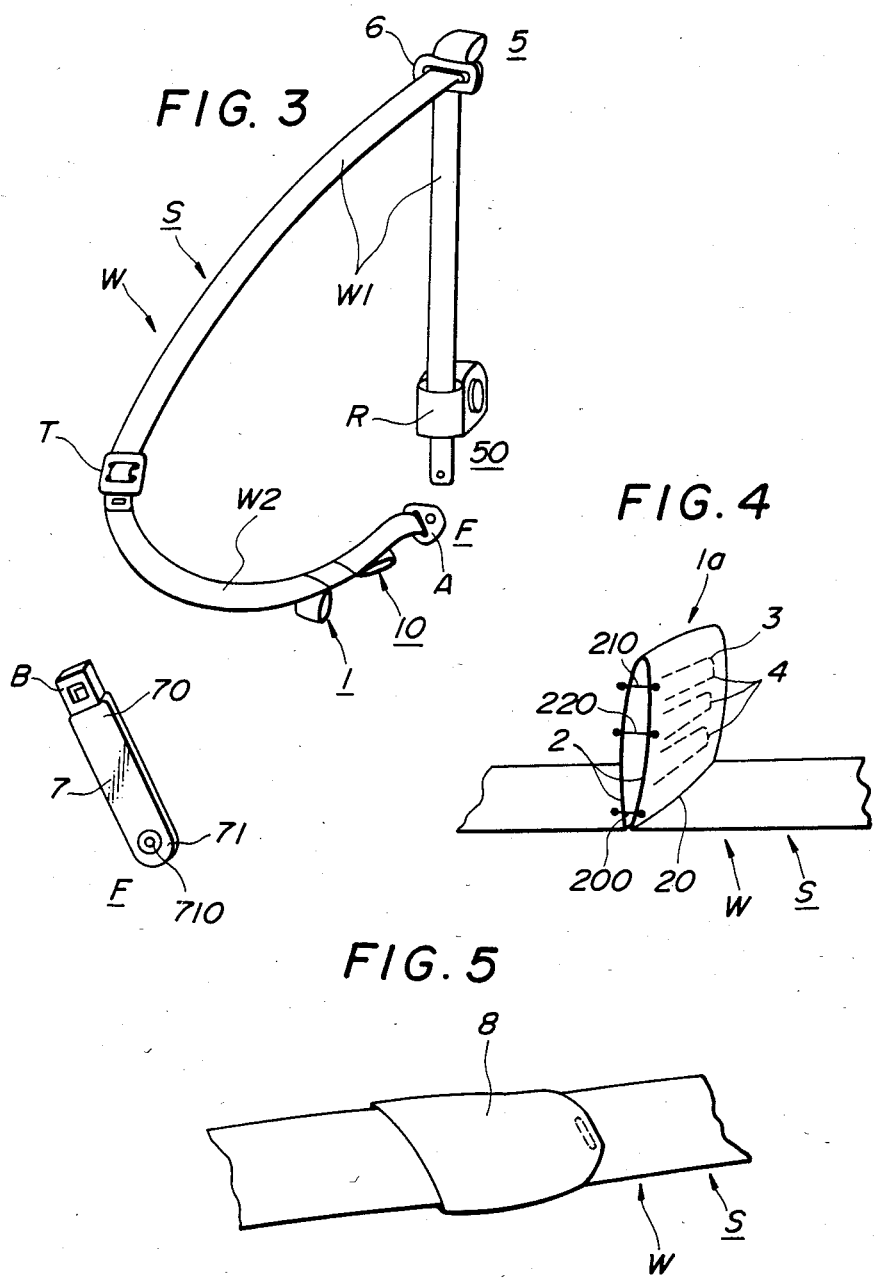

SAFETY BELT

BACKGROUND OF THE INVENTION

The present invention relates to improvements in a safety belt mounted on a seat for a vehicle.

In a conventional safety belt, as disclosed, for example, in U.S. Pat. No. 3,861,744, Japanese Patent Application Laid-open No. 118,764/1980 and Japanese Utility Model Application Laid-open No. 2027/1974, which is composed of a continuous webbing having a shoulder side outer webbing piece and a lap side outer webbing piece mounted on a seat for a vehicle, the stretching characteristic of the shoulder and lap side outer webbing pieces cannot be formed to be different.

SUMMARY OF THE INVENTION

An object of the present invention is to provide a safety belt in which the stretching characteristics of shoulder and lap side outer webbing pieces of a continuous webbing thereof composed of the shoulder and lap side outer webbing pieces are formed to be different to provide buffer and energy absorbing functions of the continuous webbing, thereby further improving the performance of a conventional safety belt.

According to the present invention in order to achieve the above and other objects, there is provided a safety belt which comprises a continuous webbing composed of a shoulder side outer webbing piece extended from an upper strengthening member at the side of an automotive body for restricting the breast of an occupant sitting on a seat and a lap side outer webbing piece extended from a lower strengthening member at the side of the body for restricting the waist of the occupant, said continuous webbing having a plurality of annularly folded portions formed thereat, each including a plurality of sewing patterns separately sewed adjacent to each other on the folded portion.

In operation, the stretching characteristics of the shoulder and lap side outer webbing pieces are formed to be different by extending the superposing margin of an energy absorbing member along the continuous webbing, the lap side being able to be extended by means of the fracture of the sewing yarns of a plurality of sewing patterns of the energy absorbing member, thereby absorbing the energy.

In this manner according to the present invention, the elongation of the webbing piece of the side provided with the energy absorbing member can be freely regulated by adjusting the length of the annularly folded portion and the number of U-shaped sewing patterns of the continuous webbing. Accordingly, the safety belt adapted for an occupant sitting on the seat of a vehicle can be readily designed. Further, since increase in the tensile load of the safety belt can be largely absorbed by the elongation and plasticity of the webbing piece of the side provided with the energy absorbing member, the peak of the tensile load can be remarkably reduced.

The above and other related objects and features will become more apparent from the following description of the preferred embodiments of the present invention when read in connection with the accompanying drawings.

BRIEF DESCRIPTION OF THE DRAWINGS

FIG. 3 is a perspective view showing a continuous webbing provided with the present invention;

FIG. 4 is a perspective view showing the energy absorbing member provided on the safety belt, with three sutures provided at the member; and FIG. 5 is a perspective view showing the energy absorbing member covered with a boot.

DESCRIPTION OF THE PREFERRED EMBODIMENTS

The present invention will now be described in more detail with reference to the accompanying drawings.

Figure 1:
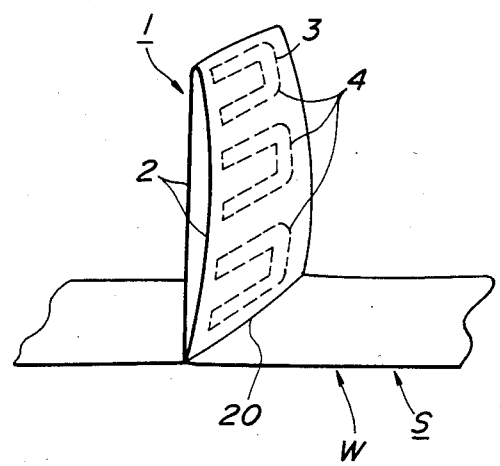
FIG. 1 is a perspective view showing an embodiment of a safety belt according to the present invention.

FIG. 1 shows an embodiment of a safety belt of the present invention. An energy absorbing member 1 is formed of an annularly folded portion 2 partly slackened at a continous webbing W. The folded portion 2 is sewed by sewing yarns 3 in a plurality of U-shaped sewing patterns 4 aligned longitudinally along the webbing adjacent to each other to be readily controlled in the fracture load of the sewing yarns 3.

Figure 2:
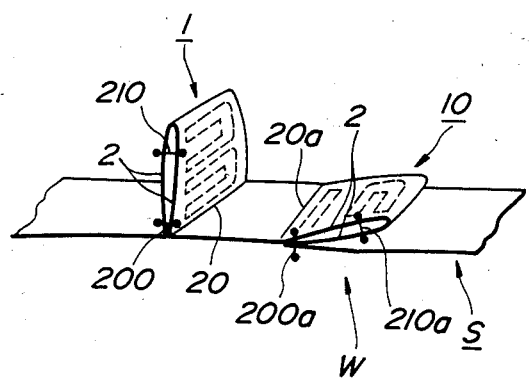
FIG. 2 is a perspective view showing the safety belt provided with two energy absorbing members shown in FIG. 1.

FIG. 2 shows another embodiment of the safety belt of the invention in which two energy absorbing members 1 and 10 are formed at the continuous webbing W. The end 200 of the annularly folded portion 2 at a root 20 of the energy absorbing member 1 is sewed in an end suture, and the other end 210 of the annularly folded portion 2 is also sewed in the other end suture.

The end 200a of the annularly folded portion 2 at a root 20a of the energy absorbing member 10 is superposed and sewed in a triple lap with the continous webbing W in an end suture, and the other end 210a of the annularly folded portion 2 is also sewed in the other end suture. Thus, the numbers of the webbing pieces superposed and folded of the energy absorbing members 1 and 10 are formed to be different so as to sequentially broken in the order to be in fracture.

FIG. 3 shows still another embodiment of the safety belt of the invention in which a lap side outer webbing piece W2 formed with the energy absorbing members 1 and 10 as shown in FIG. 2 is provided at the continuous webbing W of a safety belt S composed of a shoulder side outer webbing piece W1 mounted over between an upper strengthening member 5 and a lower strengthening member 50 at the side of an automotive body and a lap side outer webbing piece W2. The number of the energy absorbing members may be one.

The shoulder side outer webbing piece W1 is constructed to be extended from a retractor R and to be folded by means of a through ring 6. Further, a through tongue T is slidably inserted at the intermediate of the continuous webbing W composed of the shoulder and lap side outer webbing pieces W1 and W2. This tongue T may be detachably attached to a buckle B provided at one end 70 of a lap inner belt 7. A hole 710 of the other end of the lap inner belt 7 is mounted by fittings (not shown) on a floor F of an automotive body.

A reference character A designates an anchor for fixing the end of the lap side outer webbing W2 to the floor F of the body. It is noted that the number of the annularly folded portions 2 may be any. It is further noted that the annularly folded portions 2 may be formed at the side of the lap side outer webbing piece W2, as shown in FIG. 3 and may also be formed at the side of the shoulder side outer webbing piece W1.

FIG. 4 shows still another embodiment of the safety belt of the invention in which the energy absorbing member 1a is sewed not only at an end suture 200 at the end of the root 20 and at the other end suture 210 at the other end thereof, but also at an intermediate suture 220 which is intermediate between the end suture 200 and the other end suture 210, i.e. three separate sections of the belt. In this manner, the stretching characteristic of the shoulder and lap side outer webbing pieces W1 and W2 are readily selectively varied by extending the folding margins of the energy absorbing member 1(10) extended from the continuous webbing W by means of the fracture of the sewing yarns 3 of a plurality of U-shaped sewing patterns 4 of the annularly folded portion 2 forming the energy absorbing member 1(10), thereby satisfying the buffering function and the energy absorbing function of the continous webbing W.

FIG. 5 shows a modified example of the safety belt of the invention in which the external appearance of the energy absorbing piece extended from the continuous webbing W is improved by covering the continuous webbing W with a cover 8 of boot shape.

What is claimed is:

1. A safety belt secured to a seat for supporting an occupant comprising:
    an elongated webbed strap having shoulder portion means and waist portion means for retaining the seated occupant in the seat, said waist portion having end straps and expansion means for increasing the tensile strength of said waist portion means, said expansion means including at least one folded member at predetermined positions along said waist portion means and having a pair of strap sections joined along a common crease, each of said strap sections having a substantially corresponding length and being folded along said crease to be in substantially abutting relation, said pair of strap sections having abutting end surfaces opposite said crease, said end surfaces integrally connected to said waist portion means, said expansion means also including woven means for interconnecting said strap sections, said woven means including more than one U-shaped stitch extending longitudinally along said folded member, said expansion means also including suture means connecting said folded strap sections for further increasing the tensile strength provided by said expansion means.

2. The safety belt as defined in claim 1, wherein said more than one U-shaped stitch is double-stitched, the double stitched interconnected upper ends so that each of said U-shaped stitches has a continuous U-shaped pattern.

3. The safety belt as defined in claim 1, wherein said folded strap sections have substantially flush side surfaces and wherein said suture means includes at least two sutures extending through said folded strap sections proximate at least one of said side surfaces.

4. The safety belt as defined in claim 1, wherein said expansion means includes two folded members, one of said folded members providing said waist portion means with greater tensile strength than the remaining one of said folded members.

5. The safety belt as defined in claim 1, wherein said folded strap sections are folded along said waist portion means and said woven means interconnects said pair of folded strap sections and said waist portion means.

6. The safety belt as defined in claim 1, wherein said end surfaces of said folded sections are threadably interconnected.

7. A safety belt secured to a seat for supporting an occupant comprising:
    an elongated web strap having a waist portion means for retaining the seated occupant in the seat, said waist portion having expansion means for increasing the tensile strength of said waist portion means, the expansion means including at least one folded member at predetermined positions along said waist portion and having a pair of strap sections joined along a common crease, each of said strap sections having a substantially corresponding length and being folded along said crease to be in substantially abutting relation, said pair of strap sections having abutting surfaces opposite said crease, each of said end surfaces being integrally connected to said waist portion, said expansion means also including woven means for interconnecting said strap sections, said woven means including more than one individual U-shaped stitch extending longitudinally along said strap section, said expansion means also including suture means connecting said folded strap sections for further increasing the tensile strength provided by said expansion means.

* * * * *